Patented June 23, 1936

2,044,942

UNITED STATES PATENT OFFICE 2,044,942

PREPARATION OF FINELY DIVIDED CALCIUM SULPHATE

Winfield W. Heckert, Ardentown, Del., assignor, by mesne assignments, to E. I. du Pont de Nemours and Company, a corporation of Delaware No Drawing. Application March 27, 1935, Serial No. 13,223

4 Claims. (Cl. 23—122)

The present invention relates to processes of preparing calcium sulphate in the presence of a crystal growth inhibitor or restraining agent and consists in forming calcium sulphate in the presence of an organic compound which is water soluble and has the property of lowering the surface tension of water in which it is dissolved.

Compounds of this type are usually known as wetting agents and numerous compounds useful in reducing the surface tension of water are known.

Among such compounds I have found that only two types combine this property with that of acting as crystallization inhibitors for calcium sulphate. These are the alkyl naphthalene sulphonic acids, particularly those in which the alkyl group contains more than two carbon atoms and the sulphates of aliphatic alcohols contain at least 8 carbon atoms. The term "alcohol sulphate" as used herein includes the sulphuric acid reaction product of the higher aliphatic alcohols and their water soluble salts.

As a possible explanation of the specific action of these two types of wetting agents I suggest that these agents attach themselves as molecular, polar films upon the originally formed calcium sulphate particles, which film then interferes with the growth of the particles, or becomes an integral part of the particles which then on dehydration cause the particles to break up easily. I have no experimental evidence to substantiate this theory and it will therefore be understood that my invention and the appended claims are not to be limited by this possible explanation of the action of these two types of wetting agents.

By precipitating, or forming calcium sulphate in the presence of these two types of wetting agents, I achieve various desirable objects:

I obtain calcium sulphate in particularly finely divided form.

The growth of the originally formed small acicular crystals of calcium sulphate is suppressed in contact with water or the mother liquor of the reaction.

The crystals of calcium sulphate obtained in the presence of these two types of wetting agents break up very easily on subsequent dehydration to form more finely divided particles of anhydrous calcium sulphate.

The finely divided particles of calcium sulphate precipitated in the presence of these two types of wetting agents settle very easily and rapidly from aqueous media and can thereby readily be washed by decantation.

My novel restraining agents are useful in the various reactions which precipitate, or form, calcium sulphate in its various modifications, in aqueous media. Such reactions consist broadly in combining a sulphate in an aqueous medium with a calcium compound and can be exemplified by the reaction between the solution of a sulphate such as sodium, potassium, ammonium, zinc, iron, etc. sulphate with a soluble calcium salt such as the chloride, acetate, nitrate, etc. or the reaction of sulphuric acid, or an acid sulphate with lime, calcium hydroxide, calcium hydrosulphide, or a decomposable calcium salt such as calcium carbonate, calcium phosphate, etc.

The chemical reaction by which the calcium sulphate is formed is of no importance and has substantially no effect upon the action of my novel crystal growth inhibitors and these reactions are no part of my invention. It is only necessary that the particles of calcium sulphate as formed come into contact with my wetting agent.

The utility of my invention resides mainly in the fact that my novel process permits of easily and cheaply producing very small particles of calcium sulphate in its various hydrous and anhydrous forms, such as are useful for pigment extenders and other purposes.

The crystal growth restraining agents useful in my invention are broadly characterized in that they are wetting agents which contain a hydrocarbon group of at least 8 carbon atoms and contain an $SO_3$—$x$ group, in which $x$ is hydrogen or an anion such as Na, K, $NH_4$, etc. When the hydrocarbon group is aliphatic the $SO_3$ group can be attached by the S atom or through an additional O atom to the carbon. These two types are commonly called sulphuric acid reaction products of higher aliphatic alcohols. When the hydrocarbon group is aromatic, this group must also contain an aliphatic substituent of at least 3 carbon atoms and the $SO_3$—$x$ group is attached through its S atom to the hydrocarbon.

Examples of the wetting agents useful in my invention are the sulphuric acid esters and the sulphonates of octyl, decyl, lauryl, stearyl, oleyl alcohols, the propyl, butyl, pentyl, hexyl, naphthalene sulphonates, etc.

The free acids or their water soluble salts which both are included in the term sulphuric acid reaction products and sulphonate, corresponding to the above chemical constitutions can be used as the restraining agents.

The amounts of crystal growth inhibitors needed to influence the size of the calcium sulphate particles precipitated in their presence is not critical and in general I found that about 0.1 mol. per cent (based on the amount of calcium sulphate to be formed) is sufficient and that larger amounts can be used without detriment.

Detailed description of the application of my invention is given in the following examples, but it will be understood that these are given for illustrating purposes only.

*Example 1*

3.1 parts of stearyl alcohol were dissolved in 92 parts of 96% sulphuric acid and the mixture heated until reaction was completed whereby a mixture containing predominantly the sulphuric ester of stearyl alcohol was obtained with small amounts of stearyl sulfonate.

This solution was then run into 800 parts of a 12½% calcium chloride solution. A very thin slurry of calcium sulphate was obtained. The particles were smaller in size than those obtained under similar conditions from a sulphuric acid free from the stearyl reaction product. The calcium sulphate consisted of small needles and plates. These settled rapidly to a comparatively small volume and were easily washed by decantation, whereas the material precipitated from pure sulphuric acid was composed of long needles which settled slowly to a very voluminous mass of intermeshed crystals which could not be washed economically by decantation methods.

After thorough washing the precipitate was filtered and dried. The crystals were now found to undergo disintegration so that the product was now mostly non-acicular and the particles were mostly of a diameter of one micron or less.

*Example 2*

50 parts of lime were dispersed by grinding with about 10 parts of water and the slurry diluted with 1300 parts of water. 3.1 parts of lauryl alcohol were heated with 100 parts of 96% sulphuric acid whereby the lauryl alcohol was sulphated and a solution of the sulphuric acid ester of lauryl alcohol in excess sulphuric acid obtained. This was rapidly run into the above lime slurry. Calcium sulphate was precipitated with much finer particle size than in the absence of said lauryl-sulphuric ester.

It is not necessary to form the restraining agent in the sulphuric acid as in the above two examples. The sulphated higher alcohols may be prepared separately and then added to the acid or to the solution or slurry containing the calcium compound, it being only necessary that the restraining agent be present during precipitation.

*Example 3*

50 parts of lime were dispersed in 1100 parts of water as in Example 2. To this was added 3 parts of the sodium salt of the sulphuric acid ester of crude lauryl alcohol such as obtained by the hydrogenation of cocoanut oil and containing small amounts of other aliphatic alcohols having 8 or more carbon atoms. This lime slurry containing the restraining agent was then mixed with 320 parts of 30% sulphuric acid while stirring. Stirring was continued for several hours, the product filtered, washed and dried. The calcium sulphate so obtained was of a particle size much smaller than one produced in the absence of the lauryl sulphuric acid ester.

The above examples illustrate the use of the sulphuric acid esters of the long chain aliphatic alcohols, also called alcohol sulphates, which were found by me to be the most efficient agents for use in my process.

I obtained entirely similar results in replacing the alcohol sulphates of the above examples by small amounts (for instance 0.1%) of isopropyl or isobutyl naphthalene sulphonates.

My invention is furthermore not limited to reactions where calcium sulphate is produced from free sulphuric acid and a calcium compound which is entirely or partly soluble in water but is appliable to the production of calcium sulphate from sulphuric acid and aqueous slurries of calcium carbonate, calcium phosphate, etc., and it is also applicable in the metathetical reactions between a soluble sulphate such as sodium, potassium, ammonium, zinc, etc. sulphate and a soluble calcium salt such as chloride, nitrate, acetate, hydrosulphid, etc.

When reacting with zinc sulphate upon calcium hydrosulphid, one obtains a co-precipitate of calcium sulphate and zinc sulphid which can be calcined to produce a valuable white pigment. The addition of a small amount of one of my novel crystal growth restraining agents to this reaction has also a beneficial result in that the smaller particle size of the calcium sulphate obtained tends to improve the tinting strength and other pigment properties of this pigment.

I claim:

1. In a process of preparing calcium sulphate in an aqueous medium the step of forming said calcium sulphate in the presence in said aqueous medium of a wetting agent selected from the group consisting of sulphuric acid reaction products of aliphatic alcohols containing at least 8 carbon atoms and alkyl naphthalene sulphonates in which the alkyl group contains at least 3 carbon atoms.

2. In a process of preparing calcium sulphate in an aqueous medium the step of forming said calcium sulphate in the presence in said medium of a sulphate of an aliphatic alcohol containing at least 8 carbon atoms.

3. In a process of preparing calcium sulphate in an aqueous medium the step of forming said calcium sulphate in the presence in said aqueous medium of a lauryl sulphate.

4. In a process of preparing calcium sulphate in an aqueous medium the step of forming said calcium sulphate in the presence in said aqueous medium of an alkyl naphthalene sulphonate in which the alkyl group contains at least 3 carbon atoms.

WINFIELD W. HECKERT.